United States Patent
Scott

[15] 3,666,235
[45] May 30, 1972

[54] THROTTLING BUTTERFLY VALVE
[72] Inventor: Arthur A. Scott, Prospect Heights, Ill.
[73] Assignee: Eaton Yale & Towne, Inc., Cleveland, Ohio
[22] Filed: Apr. 13, 1970
[21] Appl. No.: 27,742

[52] U.S. Cl..............................251/205, 251/118, 251/306
[51] Int. Cl.............................................................F16k 1/22
[58] Field of Search ........................251/305, 306, 208, 118

[56] References Cited

UNITED STATES PATENTS

| | | | |
|---|---|---|---|
| 2,586,927 | 2/1952 | Fantz | 251/306 |
| 3,234,966 | 2/1966 | Klose | 251/306 X |
| 2,980,388 | 4/1961 | White | 251/307 X |
| 3,521,857 | 7/1970 | Over | 251/305 |
| 2,923,523 | 2/1960 | Taylor | 251/306 X |

*Primary Examiner*—Arnold Rosenthal
*Attorney*—Hill, Sherman, Meroni, Gross & Simpson

[57] ABSTRACT

Butterfly fluid flow valve having substantial flow in the full open position of the valve. The valve has a peripheral sealing lip compressed along a frusto-spherical contoured seating surface, as the valve moves to its closed position, to provide a leak-proof seal. A throttling slot extends axially along the frusto-spherical contoured seating surface for approximately one-half of valve rotation and accommodates a decreasing throttling flow as the valve moves from its full open position towards its closed position. The valve may be operated either by a vacuum motor, a manually operated lever or by any other suitable operating means.

4 Claims, 4 Drawing Figures

PATENTED MAY 30 1972

INVENTOR.
ARTHUR A. SCOTT
BY Hill, Sherman, Meroni, Gross & Simpson
ATTORNEYS

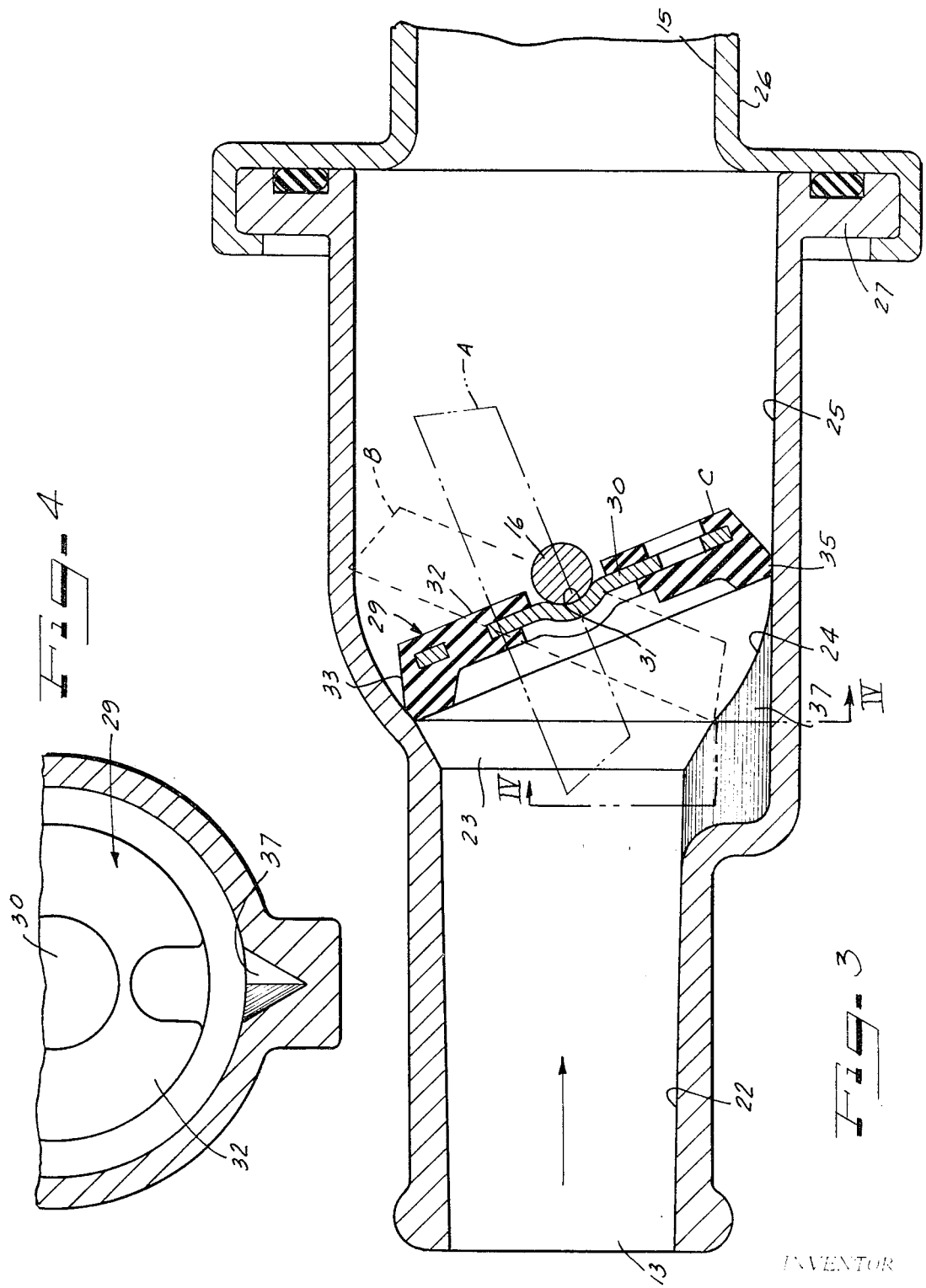

THROTTLING BUTTERFLY VALVE

SUMMARY AND OBJECTS OF THE INVENTION

Improved butterfly valve accommodating full flow when in an open position, in which the valve is made from a resilient material and has compressive engagement with a seat contoured along a generally frusto or semispherical surface, and in which a preselected throttling is attained by a throttling slot extending axially along the seat, to accommodate limited passage of fluid past the valve, and in which compressive engagement of the valve with the seat, when in a closed position of the valve, provides a leak-proof butterfly type of valve.

A principal object of the present invention is to provide an improved butterfly valve operable where leak-tight conditions are required, in which a bleed passageway extending along the valve seat for a portion of the length of travel of the valve, accommodates the throttling of fluid past the valve as the valve moves between its closed and full open positions.

Another object of the invention is to provide an improved butterfly valve capable of complete fluid flow shut-off, over a wide range of pressure variations, and providing a throttling effect as the valve moves from its fully closed position to its fully open position.

Another object of the invention is to provide a resilient butterfly valve cooperating with a contoured valve seat in the valve housing, to compressively seal the valve to its seat when in a fully closed position, and to continue the sealing effect over a wide range of pressure variations.

Still another object of the invention is to provide an improved form of butterfly valve having a contoured seat for the valve, extending over a proportionate part of travel of the valve from its open to its closed position, with a bleed passageway along the seat decreasing in cross-sectional area as the valve travels from its fully open to its fully closed position to accommodate the throttling of fluid past the valve as the valve is moved towards a shut-off position. Many other features, advantages and additional objects of the present invention will become manifest to those versed in the art upon making reference to the detailed description which follows and the accompanying sheets of drawings, in which a certain preferred structural embodiment incorporating the principles of the present invention is shown by way of illustrative example only.

DESCRIPTION OF THE DRAWINGS

FIG. 3 is a longitudinal sectional view taken substantially along lines III—III of FIG. 2; and FIG. 4 is a fragmentary sectional view taken substantially along lines IV—IV of FIG. 3.

DESCRIPTION OF PREFERRED EMBODIMENT OF THE INVENTION

Figure 1:
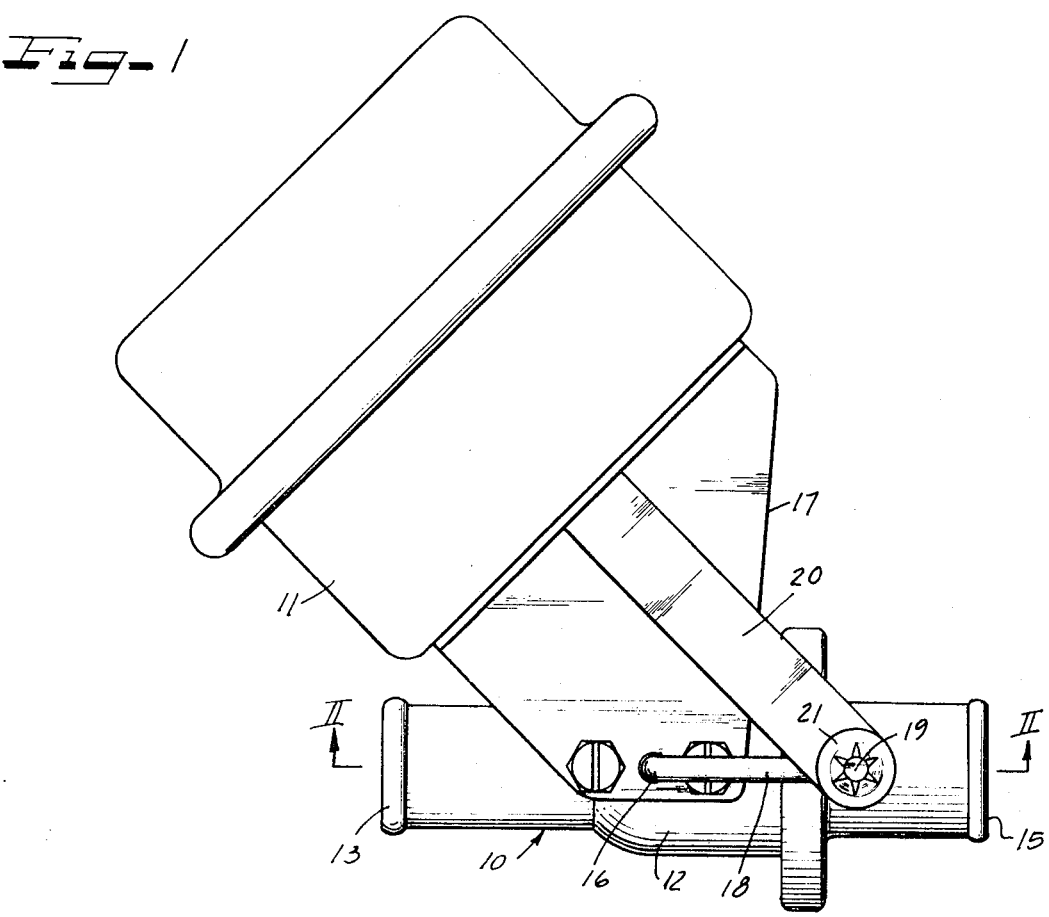
FIG. 1 is a top plan view of a vacuum-actuated butterfly valve assembly constructed in accordance with the principles of the present invention.

In FIG. 1 of the drawings, I have shown a butterfly valve assembly 10 constructed in accordance with the principles of the present invention and particularly adapted for use in automobile heater and cooling systems for completely shutting off the flow of coolant through the core of the heater when heat is not required, as for example, when the air conditioning system for the vehicle is adjusted to provide maximum cooling. The butterfly valve assembly 10 includes a vacuum motor 11 for actuating the valve. The vacuum motor may be connected to the intake manifold of the internal combustion engine, or to other suitable vacuum connections, such as the intake of the carburetor, in a manner similar to which other vacuum operated accessories, components and the like are connected with a source of vacuum. While I have herein shown a vacuum motor for operating the valve, it should be understood that the valve may be manually operated, or may be operated by other well-known operating mechanisms.

The butterfly valve assembly comprises a housing 12 having an inlet 13 leading into said housing and an axially aligned outlet 15 leading therefrom. The housing 12 has a shaft 16 leading through a mounting bracket 17 mounting the vacuum motor 11 to said housing, and diametrically through said housing, and pivotally mounted therein. The shaft 16 has an arm 18 extending at right angles with respect thereto having an upturned outer end 19 extending through a plunger or piston rod 20 extending from the piston or diaphragm of the vacuum motor 11. A snap ring 21 may be provided to connect the upturned end 19 of the arm 18 to the plunger 20.

The vacuum motor may be of the spring biased diaphragm type, operating under relatively low intake manifold vacuum. The vacuum motor 11 thus moves in response to variations in vacuum in said motor, to move the valve into an open position, or to accommodate movement of the valve into a closed position upon reductions in vacuum in the vacuum motor.

Figure 2:
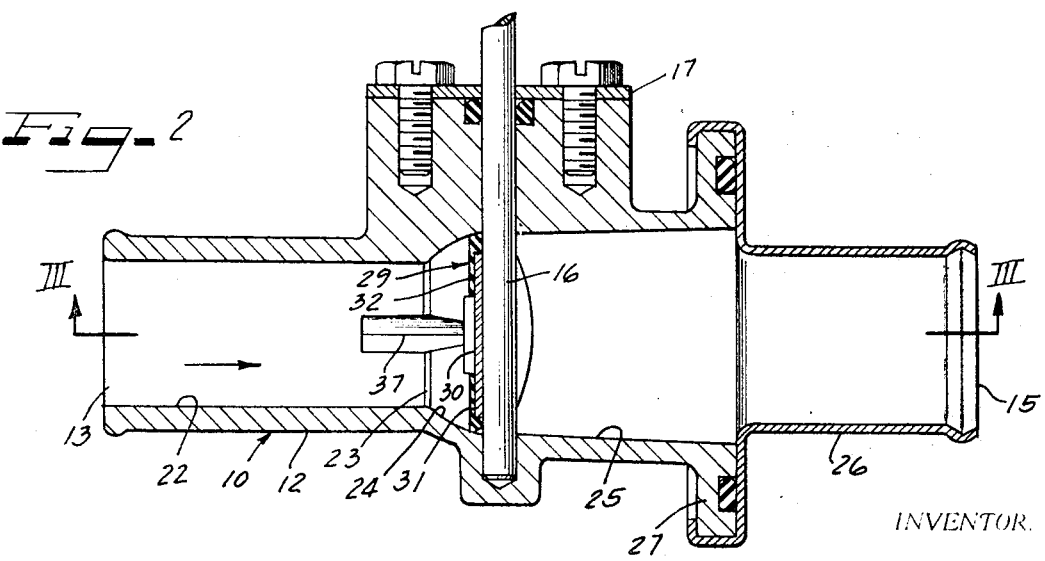
FIG. 2 is a longitudinal sectional view taken along lines II—II of FIG. 1 with certain parts removed.

Referring now to FIGS. 2 and 3, the housing 12 has an interior cylindrical inlet wall portion 22, a diverging frusto-conical wall 23 leading therefrom and a diverging generally frusto-spherical contoured valve seat 24 leading from said frusto-conical wall 23 to a relatively large diameter interior outlet wall portion 25. The outlet wall portion 25 has communication with a fitting 26 crimped over a flange 27 of the outlet wall portion, and defining the outlet 15 leading from the valve. The fitting 26 is adapted to be connected to the core of an automobile heater through a suitable hose connection, or other connecting means.

The shaft 16 extends diametrically through the outlet wall portion 25 downstream of the semi or frusto-spherical contoured seat 24, and has a disk-like butterfly valve member 29 secured thereto. As shown in FIG. 3, the butterfly valve member 29 includes a metal disk-like insert 30, having a recessed central portion 31, generally conforming to the form of the shaft 16, which may be welded or otherwise secured to said shaft. The disk-like butterfly valve member 29 includes a valve element 32 molded about the metal insert 30 and having a frusto-conical outer wall 33, the small diameter end of which is on the downstream side of the valve element and the larger diameter end of which forms a sealing lip 35 facing in an upstream direction and compressively engaged with the frusto-spherical contoured valve seat 24 as the valve moves for its fully open position A shown in FIG. 3 to its throttling position B, and into its fully closed position C. The valve element 32 may be made from rubber or one of the well-known substitutes for rubber.

It may be seen from FIG. 3 that as the valve element 39 moves from its fully open to its closed or sealing position that the sealing lip 35 is moved into engagement with the frusto-spherical seat 24 and wipingly engages said seat and is compressed thereby to provide a leak-tight seal with said valve seat.

As the valve moves along the valve seat in a clockwise direction from position C to position A to the fully open position of the valve, the compression of the sealing lip 35 continues until the valve reaches position B. As the valve moves from position B to position A, the frusto-conical wall 33 will provide release for the sealing lip and compression on the sealing lip will be reduced to zero, to accommodate the full flow of fluid through the valve at position A.

A throttling contour in the form of a V-shaped north or slot 37 leads along the interior of the valve housing from the cylindrical wall 22 toward the frusto-spherical contoured seat and along said contoured seat to provide a throttling slot, accommodating the flow of liquid past the valve, as the valve moves between its shut-off position C into its throttling position B and vice versa. This throttling slot controls the rate of increase in flow of coolant or heating fluid as the valve moves from position C to position B and vice versa, which can be increased or decreased as conditions require by varying the cross-sectional area of the throttling slot. As shown herein the slot 37 provides throttling control for substantially 45° of the rotation of the valve toward the sealing or open position of the valve, or one-half of the total amount of valve rotation from the fully open to the fully closed positions of the valve.

It should here be understood that while the fluid flow is from the small diameter internal cylindrical wall to the larger diameter internal cylindrical wall, that the flow may be reversed, and when reversed, the valve is an effective shut-off and throttling valve.

Although minor modifications might be suggested by those versed in the art, it should be understood that I wish to embody within the scope of the patent warrented hereon all such modifications as reasonably come within the scope of my contribution to the art.

I claim:

1. A butterfly fluid flow valve comprising:
a housing having,
an internal cylindrical wall of one diameter extending along one end portion of said housing and defining a fluid flow wall portion,
an axially aligned larger diameter cylindrical wall portion extending along the opposite end portion of said housing and defining a fluid flow chamber in direct fluid flow connection with said first-mentioned internal cylindrical wall,
a uniformly contoured frusto-spherical valve seat diverging with respect to said first-mentioned internal cylindrical wall toward said larger diameter cylindrical wall,
a shaft extending transversely of said larger diameter cylindrical wall portion and spaced along said larger diameter cylindrical wall portion from said frusto-spherical valve seat in a downstream direction,
a compressible rubber butterfly valve element carried by said shaft within said large diameter cylindrical wall portion and having a frusto-conical outer wall,
a resilient sealing lip at the large diameter end of said outer wall having compressive wiping, sealing engagement with said frusto-spherical valve seat and movable about the axis of said shaft to release said valve element from said valve seat and reduce the compression of said valve element to zero as said valve element moves to a wide open position, to accommodate the full flow of fluid through said housing,
and a throttling notch extending longitudinally along said cylindrical wall portion of one diameter and along said frusto-spherical valve seat to said larger diameter cylindrical wall portion.

2. The butterfly fluid flow valve of claim 1 wherein the internal cylindrical wall of one diameter defines a fluid flow inlet wall portion,
wherein the larger diameter aligned cylindrical wall portion defines a flow chamber for outlet fluid, and
wherein the throttling notch has a relatively large area opening to the inlet wall portion and converges as it extends along the valve seat from the inlet wall portion towards said outlet chamber and is generally V-shaped in cross section.

3. A butterfly fluid flow valve comprising:
a housing,
an internal cylindrical wall of one diameter extending along one end portion of said housing and defining a fluid flow wall portion,
an axially aligned larger diameter cylindrical wall portion extending along the opposite end portion of said housing and defining a flow chamber in direct communication with said fluid flow wall portion,
a diverging frusto-conical wall leading from said internal cylindrical wall portion of one diameter,
a uniformly contoured frusto-spherical wall diverging with respect to said frusto-conical wall to said larger diameter cylindrical wall portion and defining a frusto-spherical valve seat,
a resilient butterfly valve element having a peripheral sealing lip compressively engaged with said frusto-spherical contoured wall during valve movement from its open toward its closed position, and
a throttling notch extending longitudinally along said frusto-spherical diverging wall forming the valve seat.

4. The butterfly valve of claim 3,
wherein the throttling notch extends along said internal cylindrical wall of one diameter and along said frusto-spherical valve seat to the end thereof, and is generally V-shaped in cross section and converges from said internal cylindrical wall of one diameter along said frusto-spherical wall to said axially aligned larger diameter cylindrical wall portion.

* * * * *